(12) United States Patent
Fadli

(10) Patent No.: US 10,528,959 B2
(45) Date of Patent: *Jan. 7, 2020

(54) MICRO-MOMENT ANALYSIS

(71) Applicant: MMS USA HOLDINGS INC., Boston, MA (US)

(72) Inventor: Samih Fadli, Seattle, WA (US)

(73) Assignee: MMS USA HOLDINGS INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,285

(22) Filed: Jun. 28, 2019

(65) Prior Publication Data
US 2019/0340629 A1 Nov. 7, 2019

Related U.S. Application Data

(63) Continuation of application No. 16/424,179, filed on May 28, 2019, and a continuation-in-part of (Continued)

(51) Int. Cl.
*G06Q 30/02* (2012.01)
*G06N 3/04* (2006.01)
*G06F 17/16* (2006.01)

(52) U.S. Cl.
CPC ......... *G06Q 30/0202* (2013.01); *G06F 17/16* (2013.01); *G06N 3/0472* (2013.01); *G06Q 30/0201* (2013.01); *G06Q 30/0242* (2013.01); *G06Q 30/0243* (2013.01); *G06Q 30/0244* (2013.01); *G06Q 30/0251* (2013.01); *G06Q 30/0255* (2013.01); *G06Q 30/0277* (2013.01)

(58) Field of Classification Search
CPC ....................................... G06Q 30/0207–0277
See application file for complete search history.

(56) References Cited

U.S. PATENT DOCUMENTS 5,172,204 A * 12/1992 Hartstein ............... G06N 3/063
706/33
5,293,457 A * 3/1994 Arima ................... G06N 3/063
706/34

(Continued)

FOREIGN PATENT DOCUMENTS

JP 2011-525257 A * 9/2011 ............ G06Q 30/00
WO WO 2000/042593 A1 * 7/2000 ............ G06Q 30/06

OTHER PUBLICATIONS

Which Clicks Lead to Conversions, Modeling User-journeys Across Multiple Types of Online Advertising, Nottorf Florian, ICE-B 2013—10th International Conference on E-Business.*

(Continued)

*Primary Examiner* — David J Stoltenberg
(74) *Attorney, Agent, or Firm* — Loeb & Loeb LLP

(57) ABSTRACT

A computer-implemented method for determining a micro-moment value that indicates an optimal time for a customer to receive a targeted advertisement. The method includes receiving, via a network, customer data associated with behavior of a plurality of customers. The method includes determining, via one or more processors, a micro-moment value predicting an optimal time and network location to engage a customer based on the customer data.

16 Claims, 7 Drawing Sheets

Related U.S. Application Data application No. 15/269,786, filed on Sep. 19, 2016, now abandoned, and a continuation-in-part of application No. 15/269,642, filed on Sep. 19, 2016.

(60) Provisional application No. 62/220,727, filed on Sep. 18, 2015, provisional application No. 62/288,763, filed on Jan. 29, 2016.

(56) References Cited

U.S. PATENT DOCUMENTS

| | | | |
|---|---|---|---|
| 5,845,051 A * | 12/1998 | Oh | G06N 3/08 706/25 |
| 6,601,052 B1 * | 7/2003 | Lee | G06N 3/0454 706/25 |
| 6,714,975 B1 * | 3/2004 | Aggarwal | G06Q 30/02 709/224 |
| 7,948,400 B2 * | 5/2011 | Horvitz | G08G 1/0104 340/933 |
| 9,336,483 B1 * | 5/2016 | Abeysooriya | G06N 3/08 |
| 9,652,797 B2 * | 5/2017 | Vijayaraghavan | G06Q 30/0631 |
| 9,866,695 B1 * | 1/2018 | Modi | H04M 3/5175 |
| 2003/0028451 A1 * | 2/2003 | Ananian | G06Q 30/02 705/26.42 |
| 2004/0003042 A1 | 1/2004 | Horvitz | |
| 2004/0103024 A1 * | 5/2004 | Patel | G06Q 30/02 705/14.53 |
| 2005/0273388 A1 * | 12/2005 | Roetter | G06Q 30/02 705/14.4 |
| 2005/0288954 A1 * | 12/2005 | McCarthy | A61B 5/6815 705/2 |
| 2006/0212350 A1 * | 9/2006 | Ellis | G06Q 30/0242 705/14.41 |
| 2007/0033098 A1 * | 2/2007 | Peters | G06Q 30/02 705/14.25 |
| 2008/0126108 A1 * | 5/2008 | Hodgin | G01W 1/10 705/1.1 |
| 2009/0106734 A1 * | 4/2009 | Riesen | G06N 7/005 717/104 |
| 2009/0119160 A1 * | 5/2009 | Woda | G06Q 30/02 705/14.1 |
| 2010/0042496 A1 * | 2/2010 | Wang | G06Q 10/087 705/14.49 |
| 2010/0082439 A9 * | 4/2010 | Patel | G06Q 30/02 705/14.72 |
| 2011/0040613 A1 * | 2/2011 | Simmons | G06Q 30/02 705/14.42 |
| 2011/0071900 A1 * | 3/2011 | Kamath | G06Q 30/02 705/14.46 |
| 2011/0191714 A1 * | 8/2011 | Ting | G06F 3/048 715/805 |
| 2011/0307515 A1 * | 12/2011 | Chen | G06Q 30/02 707/770 |
| 2011/0320395 A1 * | 12/2011 | Dada | G06Q 30/02 706/47 |
| 2012/0054019 A1 * | 3/2012 | Kitts | G06Q 30/0242 705/14.41 |
| 2012/0078708 A1 * | 3/2012 | Taylor | G06Q 30/0242 705/14.41 |
| 2012/0259841 A1 * | 10/2012 | Hsiao | G06Q 30/0277 707/722 |
| 2012/0259851 A1 * | 10/2012 | Jia | G06Q 30/0242 707/737 |
| 2012/0259854 A1 * | 10/2012 | Hsiao | G06F 16/958 707/739 |
| 2012/0259871 A1 * | 10/2012 | Holmes | G06Q 30/0242 707/753 |
| 2012/0260185 A1 * | 10/2012 | Choc | G06Q 30/0241 715/738 |
| 2012/0303447 A1 * | 11/2012 | Hughes | G06Q 30/0255 705/14.46 |
| 2013/0021345 A1 * | 1/2013 | Hsiao | G06Q 30/0241 345/440.2 |
| 2013/0041748 A1 * | 2/2013 | Hsiao | G06Q 30/02 705/14.41 |
| 2013/0054352 A1 * | 2/2013 | Ferber | G06Q 30/02 705/14.45 |
| 2013/0055137 A1 * | 2/2013 | Choc | G06Q 30/02 715/772 |
| 2013/0073388 A1 * | 3/2013 | Heath | G06Q 50/01 705/14.53 |
| 2013/0080362 A1 * | 3/2013 | Chang | G06Q 30/0255 706/21 |
| 2013/0124299 A1 * | 5/2013 | Montgomery | G06Q 30/0244 705/14.43 |
| 2013/0129076 A1 * | 5/2013 | Kannan | H04M 3/5175 379/265.09 |
| 2013/0159227 A1 * | 6/2013 | Dasgupta | G06N 20/00 706/12 |
| 2013/0179440 A1 * | 7/2013 | Gordon | G06Q 10/06 707/731 |
| 2013/0253969 A1 * | 9/2013 | Das | G06Q 30/0208 705/7.13 |
| 2013/0268468 A1 * | 10/2013 | Vijayaraghavan | G06Q 30/02 706/12 |
| 2014/0006293 A1 * | 1/2014 | Chang | G06Q 30/0202 705/304 |
| 2014/0089232 A1 * | 3/2014 | Buibas | G06N 3/049 706/11 |
| 2014/0120864 A1 * | 5/2014 | Manolarakis | H04W 24/08 455/405 |
| 2014/0289038 A1 * | 9/2014 | Hasson | G06Q 30/0242 705/14.45 |
| 2014/0379428 A1 * | 12/2014 | Phansalkar | G06Q 30/0202 705/7.32 |
| 2015/0007081 A1 * | 1/2015 | Hsiao | G06Q 30/0241 715/771 |
| 2015/0081597 A1 * | 3/2015 | Chang | G06Q 30/0255 706/11 |
| 2015/0154632 A1 * | 6/2015 | Jindal | G06Q 30/0246 705/14.45 |
| 2015/0161625 A1 * | 6/2015 | Heath | G06Q 30/0201 705/7.29 |
| 2015/0161648 A1 * | 6/2015 | Heath | G06Q 30/0201 705/14.36 |
| 2015/0161652 A1 * | 6/2015 | Schnabl | G06Q 30/0242 705/14.41 |
| 2015/0161654 A1 * | 6/2015 | Little | G06Q 30/0242 705/14.42 |
| 2015/0161655 A1 * | 6/2015 | Bidyuk | G06Q 30/0242 705/14.42 |
| 2015/0161657 A1 * | 6/2015 | Bidyuk | G06Q 30/0242 705/14.45 |
| 2015/0163311 A1 * | 6/2015 | Heath | G06Q 30/0201 709/204 |
| 2015/0206178 A1 * | 7/2015 | Roetter | G06Q 30/02 705/14.45 |
| 2015/0220951 A1 | 8/2015 | Kurapati | |
| 2015/0235240 A1 * | 8/2015 | Chang | G06Q 30/0202 705/7.31 |
| 2015/0262217 A1 * | 9/2015 | Hoyne | G06Q 30/0242 705/14.41 |
| 2016/0027041 A1 * | 1/2016 | Zhong | H04L 67/22 705/14.45 |
| 2016/0034948 A1 * | 2/2016 | Zhong | G06Q 30/0246 705/14.45 |
| 2016/0071126 A1 * | 3/2016 | Chang | G06Q 30/0255 705/7.31 |
| 2016/0078456 A1 * | 3/2016 | Chakraborty | G06Q 30/0202 705/7.31 |
| 2016/0098735 A1 * | 4/2016 | Sinha | G06Q 30/0202 705/7.31 |
| 2016/0210656 A1 * | 7/2016 | Chittilappilly | G06Q 30/0246 |
| 2016/0217515 A1 * | 7/2016 | Vijayaraghavan | G06Q 30/02 |
| 2016/0267521 A1 * | 9/2016 | Sankaran | G06Q 30/0241 |
| 2016/0342911 A1 * | 11/2016 | Kannan | G06Q 10/0631 |
| 2016/0358232 A1 * | 12/2016 | Wang | G06Q 10/087 |

(56) References Cited

U.S. PATENT DOCUMENTS

| | | | | |
|---|---|---|---|---|
| 2016/0371703 | A1* | 12/2016 | Monegan | G06Q 30/016 |
| 2017/0024656 | A1* | 1/2017 | Gilon | G16H 20/70 |
| 2017/0046732 | A1* | 2/2017 | Elmachtoub | G06Q 30/0243 |
| 2017/0068985 | A1* | 3/2017 | Singh | G06Q 20/20 |
| 2017/0076357 | A1* | 3/2017 | Peddinti | G06Q 30/0635 |
| 2017/0083916 | A1* | 3/2017 | Fadli | G06Q 30/0246 |
| 2017/0083937 | A1* | 3/2017 | Fadli | G06Q 30/0246 |
| 2017/0094058 | A1* | 3/2017 | Piaggio | H04M 3/5191 |
| 2017/0169331 | A1* | 6/2017 | Garner | G06N 3/082 |
| 2017/0180554 | A1* | 6/2017 | McCormack | H04M 3/5191 |
| 2017/0278117 | A1* | 9/2017 | Wallace | G06Q 30/0203 |
| 2017/0293919 | A1* | 10/2017 | Li | G06N 20/00 |
| 2018/0047043 | A1* | 2/2018 | Bharadwaj | G01W 1/00 |
| 2018/0053199 | A1* | 2/2018 | Mathis | G06F 16/285 |
| 2018/0144350 | A1* | 5/2018 | Mazak | G06Q 30/0201 |
| 2018/0300748 | A1* | 10/2018 | Flaks | G06Q 30/0243 |
| 2018/0308123 | A1* | 10/2018 | Zhong | G06Q 30/0273 |
| 2019/0266622 | A1* | 8/2019 | Turnbull | G06N 5/048 |
| 2019/0279236 | A1* | 9/2019 | Fadli | G06Q 30/0201 |

OTHER PUBLICATIONS

An Overview of Computational Challenges in Online Advertising, Chatwin, Richard E., 2013 American Control Conference (ACC), Washington, DC, USA, Jun. 17-19, 2013.*

Cheng, J., Marketo Data Tells Us: What Is the Top Conversion Rate by Channel? <URL:http://blog.marketo.com/2015/08/marketo-data-tells-us-what-is-the-top-conversion-rate-by-channel.html>, dated Aug. 3, 2015, 4 pages.

Darwiche, "Bayesian Networks," in 53.12 Comms. ACM 80-90 (2010). (Year: 2010) (11 pages).

Darwiche, "Bayesian Networks," in The Handbook of Knowledge Representation 467-509 (Harmelen et al. eds. 2008). (Year: 2008).

Hsieh et al., "A Data Driven Ensemble Classifier for Credit Scoring Analysis," in 27 Expert Systems with Applications 534-545 (2010). (Year: 2010).

International Searching Authority, International Search Report and Written Opinion in corresponding Application No. PCT/US2016/052509, dated Jan. 17, 2017, 11 pages.

International Searching Authority, International Search Report and Written Opinion in corresponding Application No. PCT/US2016/052536, dated Dec. 8, 2016, 7 pages.

Introduction, the Perceptron, Haim Spolinsky, Massachusetts Institute of Technology, Oct. 4, 2013 (10 pages).

Jeziorski, P. and Moorthy, S., Brand Effects in Search Advertising, <URL: http://www.isid.ac.in/-epu/acegd2014/ Papers/SridharMoorthy.pdf>, dated Sep. 11, 2014, 31 pages.

Jeziorski, P. and Segal, I., What Makes Them Click: Empirical Analysis of Consumer Demand for Search Advertising; <URL: http://faculty.haas.berkeley.edu/przemek/ads_paper.pdf>, dated Jul. 11, 2014, 39 pages.

Jeziorski, P. et al., "Brand effects in search advertising.", (Sep. 11, 2014), URL: http://www.isid.ac.in/~epu/acegd2014/papers/SridharMoorthy.pdf, (Nov. 14, 2016), XP055374538. 31 pages.

Office Action dated Jul. 12, 2018 for U.S. Appl. No. 15/269,786 (pp. 1-12).

Office Action dated Jul. 25, 2019 for U.S. Appl. No. 16/424,179 (pp. 1-22).

Office Action dated Jun. 6, 2019 for U.S. Appl. No. 15/269,642 (pp. 1-22).

Office Action dated Nov. 29, 2018 for U.S. Appl. No. 15/269,786 (pp. 1-16).

Singh, "Learning Bayesian Networks from Incomplete Data," in AAAI/IAAI 534-539 (1997). (Year: 1997) (6 pages).

* cited by examiner

MICRO-MOMENT ANALYSIS

CROSS-REFERENCE TO RELATED APPLICATIONS

This application is a continuation of U.S. application Ser. No. 16/424,179, filed May 28, 2019 entitled "Micro-Moment Analysis", which is a continuation-in-part of U.S. application Ser. No. 15/269,786, filed Sep. 19, 2016 entitled "Micro-Moment Analysis" and U.S. application Ser. No. 15/269,642, filed Sep. 19, 2016 entitled "Universal Identification" which applications claim priority from U.S. Provisional Application No. 62/220,727, filed Sep. 18, 2015, and to U.S. Provisional Application No. 62/288,763, filed Jan. 29, 2016. The disclosures of the applications referenced above are incorporated by reference herein in their entirety.

FIELD OF TECHNOLOGY

The present disclosure relates to the analysis of data using machine learning and other artificial intelligence algorithms and delivering that data to end users who are identified by the algorithms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

We are in the age of customer empowerment, where customers expect brands to be connected and relevant and to meet their needs at every interaction. To do so, leading marketers are taking a customer-obsessed approach to transforming their business by investing in the data, talents, tools and strategies needed to respond to the needs of the connected customer.

Today, many brands struggle to keep pace with the volume, velocity and variety of data in order to meet customer expectations. According to Gartner research, 90% of the world's data has been created during the past two years. This growth and availability of data has led to an expectation of data usage to enable relevant, personalized experiences. It is not enough to collect and structure the data, it must be acted upon. Consumers expect timely, relevant and seamless brand experiences. Therefore, brands must anticipate and predict their customers' needs, habit, trends and preferences to engage their customers in 1:1 conversation at the right moment of decision making.

As the connected economy marches forward at an accelerating pace, data is proving to be marketing's most valuable currency. Oceans of data generated from the Internet of Things (IoT) will magnify both the problem and the opportunity. But additional data lacks value if it can't be reduced to useful insight that informs a unique, differentiated brand experience.

A phenomenon described as "data paralysis" keeps much of the data unused. While the opportunities are vast, as the volume, variety and velocity of data generated from a connected economy explodes, digital marketing becomes increasingly difficult. By some measures, the amount of stored information grows four times faster than the world economy, while the processing power of computers grows nine times faster. It's little wonder marketers struggle with information overload that ironically reduces them to data paralysis where the benefits from data are never fully realized. In part, this scenario stems from a lack of the right mix of algorithms and technology for translating big data to actionable intelligence.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A Machine Intelligence Platform provides a way forward from data paralysis and takes full advantage of technology breakthroughs in machine learning algorithms, deep learning networks and Artificial Intelligence (AI). The Machine Intelligence Platform may shift from data-driven marketing to intelligent marketing, where everyday decisions are informed by potentially billions of data points, rather than guesses and assumptions. Working with huge sources of structured, semi-structured and unstructured data, the platform may ingest, analyze and compare the data. Machine-learning algorithms can provide statistical evidence that something might be wrong or right based on how many past occurrences of similar patterns exist.

A "micro-moments" strategy to data analysis may provide further insight. As customers consume content, interact with each other and engage in multiple, simultaneous conversations, marketers have the challenge of determining the optimal moment to engage. During these optimal opportunities, known as micro-moments, the buyer may decide to either continue or abandon a relationship with the brand. Each micro-moment may be considered a "fingerprint" of a user's online activity that may be tracked across multiple websites and devices. Such micro-moments are real-time, intent-driven events that are a critical opportunity for brands to shape customer decisions and preferences. Each micro-moment may be analyzed as data container or "radian" for purposes of analyzing a customer's complete online journey, as described herein.

In some embodiments, a computer system or a computer-implemented method may determine a micro-moment value. The system or method may receive a plurality of signals from a plurality of online actions. The plurality of signals may correspond to an online profile for a consumer (p), and each of the plurality of signals may include one or more of a past duration, a past network location, a past time period, and a past action type. The system and method may also determine a predicted micro-moment value based on the plurality of signals, the micro-moment value predicting one or more of a future duration, a future network location, and a future time period for a further online action for the consumer. The micro-moment value may consist of:

$$MMV_1 = \sum_{c=1}^{p} \sum_{e=1}^{y} \left(\frac{RCV}{Y_{i,t}}\right) * \left(\frac{\Pi radians}{channel}\right)$$

wherein:

$$\sum_{c=1}^{p}$$

includes a conversion index (c) for the plurality of signals that include a conversion (c=1) across the plurality of online profiles (p), and consists of:

$$\sum_{Conversion\ Index\ (c)=1}^{Total\ Number\ of\ Profiles\ (p)}.$$

The value for:

$$\sum_{e=1}^{y}\left(\frac{RCV}{Y_{i,t}}\right)$$

may include a click rate through domains, wherein the click rate through domains consists of:

$$\sum_{Customer\ Experience\ Value\ (e)=1\ or\ 0}^{Click\ Index\ (y)} \frac{Real\text{-}time\ Customer\ Journey\ Value\ (RCV)}{Contextual\ Signals\ Value\ (Y)}$$

and the click index (y) includes a primary key for each of the plurality of signals, the customer experience value includes a value of 1 for each of the plurality of signals that includes the conversion or a value of 0 for each of the plurality of signals that does not include the conversion, the RCV includes an index value for each of the plurality of signals, and Y includes a value based on the past action type. Likewise, the value for:

$$\left(\frac{\Pi radians}{channel}\right)$$

includes a click rate per channel and the click rate per channel consists of:

$$\left(\frac{\Pi radian\ value}{channel}\right)$$

the radian value consists of a value based on a total number for the plurality of signals and the channel equals a value corresponding to a type of device accessing the domain. Further, the system or method may engage the customer when the micro-moment value reaches a duration and a time period corresponding to a predicted key moment in a plot of the predicted micro-moment values, wherein the micro moment value indicates an optimal time and network location to engage the customer.

The Machine Intelligence Platform may map the entire customer journey across devices and channels to predict how the consumer wants to interact with the brand and personalize each moment for the consumer. As the volume of data grows, intelligence extracted using a Micro-Moments Value Algorithm can ingest and activate data from multiple sources to provide insights that allow us to tap into micro-moments in the consumer's journey.

Real-time cognitive commerce may enable marketers to customize the shopping experience by supporting individually tuned merchandising, product recommendations, personalized search and guided navigation. Machine learning capabilities may support delivery of targeted and dynamic pricing and promotion. Algorithms may learn shopping behavior in real time to update the relevance of the customer experience as it occurs.

Machine learning may unlock the power of data and deliver highly customized experiences. In some embodiments, the Machine Intelligence Platform may determine the best available assets, the right creative, message, offer, and call-to-action at the right moment using real-time customer insights and customer-level attribution. Data-driven audience segments may be dynamically created and activated across the marketer's Commerce, Media and Customer Engagement channels.

Within the Machine Intelligence Platform, a High-Frequency Intelligence Hub may process millions of signals and personalized streams of data to customize and activate targeted communication across channels, letting marketers engage with customers when they are shown to be most receptive to a message. This enables marketers and brands to use Intelligence-as-a-Service to inform Media, Commerce, CRM and Customer Experience simultaneously while providing insight and intelligence.

Further, a universal identification graph algorithm may help marketers connect identities across devices and channels (i.e., across a device such as a mobile phone, desktop, TV, etc.) to one customer. The universal identification may allow marketers to seamlessly and securely engage customers with relevant brand experience as they move between devices and across all digital touch-points.

In one embodiment, the disclosure describes a computer-implemented method for determining a micro-moment value. The method may include receiving, via a network, customer data associated with behavior of a plurality of customers. The method may also include determining, via one or more processors, a signal of a click rate through domains based on the customer data. The method may also include determining, via the one or more processors, a radian rate per channel based on the customer data, and determining, via the one or more processors, a conversion rate based on the signal of the click rate through domains. The method may also include determining, via the one or more processors, a micro-moment value based on the radian rate per channel and the conversion rate.

In further embodiments, the disclosure described a digital marketing platform comprising at least one processor and at least one memory storing computer executable instructions that, when executed by the at least one processor, cause the apparatus at least to perform a method. The method may include receiving, via a network, customer data associated with behavior of a plurality of customers. The method may also include determining, via one or more processors, a signal of a click rate through domains based on the customer data. The method may also include determining, via the one or more processors, a radian rate per channel based on the customer data, and determining, via the one or more processors, a conversion rate based on the signal of the click rate through domains. The method may also include determining, via the one or more processors, a micro-moment value based on the radian rate per channel and the conversion rate.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
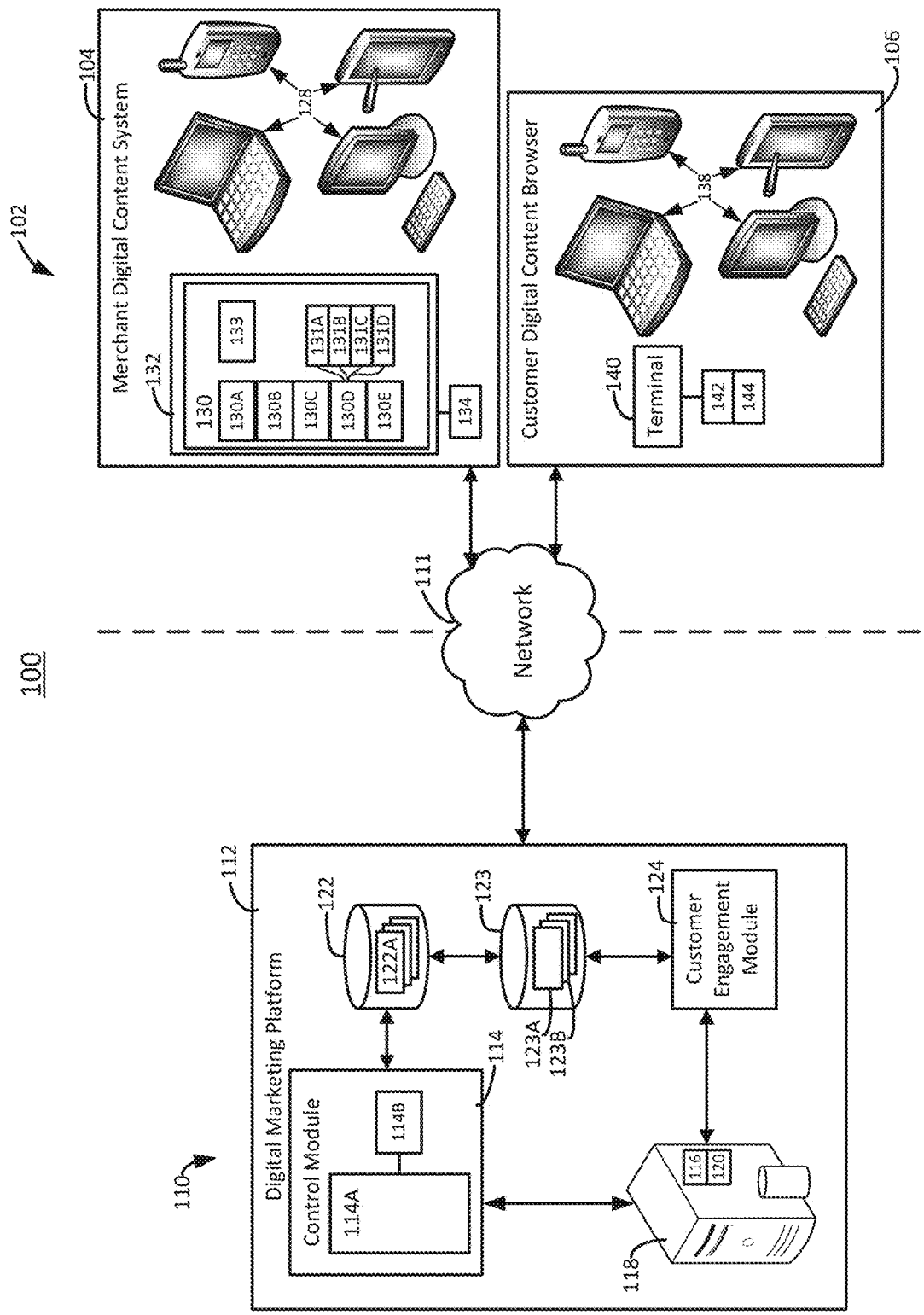
FIG. 1 illustrates a system for linking dynamic information to a digital marketing platform as described herein.

FIG. 1 generally illustrates one embodiment of a system 100 for creating and using a digital marketing platform as described herein. The system 100 may include front end components 102 (e.g., a merchant digital content system 104, customer digital content browser 106, etc.) and backend components 110 (e.g., a digital marketing platform 112). The front end components 102 and backend components 110 may be in communication with each other via a communication link 111 (e.g., computer network, internet connection, etc.). The system 100 may include various software or computer-executable instructions and specialized hardware components or modules that employ the software and instructions to provide a digital marketing platform with dynamic data records as described herein. The various modules may be implemented as computer-readable storage memories containing computer-readable instructions (i.e., software) for execution by a processor of the computer system 100 within a specialized or unique computing device. The modules may perform the various tasks associated with creating and using a digital marketing platform as described herein. The system 100 may also include both hardware and software applications, as well as various data communications channels for communicating data between the various specialized or unique front end 102 and back end 110 hardware and software components.

Generally, in some embodiments, the digital marketing platform 112 and other backend components 110 may receive and store various types of consumer data gathered from one or more customer digital content browsers 106 via a network 111 or otherwise. In some embodiments, data on groups of consumers or on particular consumers may be received via the merchant digital content system 104 of one or more merchants (only one merchant digital content system shown in FIG. 1 for purposes illustration, but more merchants are contemplated in some embodiments). The digital marketing platform 112 may, in some embodiments, analyze the data in ways that are useful to predicting consumer behavior, such as making online purchases, so as to engage with the customer at a time that may influence those purchase or other decisions. In some embodiments, and as described herein, the gathered data may be used to determine a micro-moment value using a micro-moment algorithm. The micro-moment value may then be used to predict consumer behavior and to engage the consumer based on that predicted behavior. In some embodiments, a merchant may receive the results of data analyses from the digital marketing platform 112 in order to aide in engaging customers to the merchant's online marketplace(s).

The digital marketing platform 112 may include one or more instruction modules including a control module 114 that, generally, may include instructions to cause a processor 116 of a data processing server 118 to functionally communicate with a plurality of other computer-executable steps or modules 114A and 114B. These modules 114, 114A-B may include instructions that, upon loading into the server memory 120 and execution by one or more computer processors 116, provide the digital marketing platform with a dynamic data record of customer behavior. A first data repository 122 may include digital marketing data profiles 122A that each include various pieces of data to describe a profile of a consumer or customer and potential beneficiary of the digital marketing platform 112. A second data repository 123 may include a plurality of dynamic data records, for example, a first dynamic data record 123A, a second dynamic data record 123B, etc., corresponding to each digital marketing data profile 122A. The records 123A may each include various pieces of data to describe transactions or other online behaviors of a consumer or potential customer benefiting from the digital marketing platform 112. In some embodiments, the records 123A and or B may include a time, an amount, a location, a route, a purchase category, photo data, a medium, content data, and other data as described herein.

The records 123A may be compiled from the online actions of a consumer from a variety of data streams. For example, the records 123A may include syntactic information to allow the system 100 to determine a degree of probability that one or more online actions corresponding to a consumer will occur again as well as how many times that action has occurred related to a consumer. The data streams associated with the records 123A may include data from the DoubleClick® service provided by Google Inc., social media outlets, merchants, mapping services, and other services that monitor and collect online data with user consent that may be matched to a user or consumer immediately or, with further analysis, may be matched to a user.

The customer digital content browser may include any components that are used by a consumer to complete online transactions, participate in social media, use mobile applications, browse the Internet, or otherwise participate in behavior contributing to data gathered by the digital marketing platform 112. For example, the customer digital content browser 106 may include a terminal 140 that is used by one or more computing devices 138 to gather customer behavioral data. The terminal 140 may include both a memory 142 and processor 144 to execute instructions to send the customer information and other behavioral data to the digital marketing platform 112. In some embodiments, the computing devices may send data directly to the digital marketing platform without including a terminal.

A customer engagement module 124 of the digital marketing platform 112 may include various instructions that, upon execution by the processor 116, facilitate execution of customer engagement. The module 124 may include instructions that, upon loading into the server memory 120 and execution by one or more computer processors 116, allow the digital marketing platform to draw upon data profiles 122A to execute a marketing, promotional communication, offer, or other consumer engagement using, for example, data from the data profile as described herein and also coordinate with the control module 114 and a dynamic transaction records module 130 to permit interaction with a dynamic data record 123A.

The control module 114 may also include instructions to coordinate execution of other instructions to link photos, reviews, social media capabilities, and behavioral data to a data record 123A. For example, a link module 114A may include instructions to cause a dynamic records module 130 stored in a memory 132 on a merchant computing device 128 to display a plurality of interfaces (e.g., 130A-E, 131A-D) within a display of the user computing device 128. In some embodiments, the display may include a browser or other application stored in the memory 132 and executed on a processor 134 of the computing device 128 to display an output of the dynamic data records module 130.

The dynamic data records module 130 may include several elements including a dynamic consumer controls module 130A, a reviews module 130B, a loyalty platform module 130C, an transaction record module 130D, and an alerts module 130E which may include several sub-modules to implement particular functions with a single data record 123A or to collectively display information related to a plurality of data records 123A and 123B, etc. For example, the transaction record module 130D may include several sub-modules including a payment module 131A, a social media module 131B, a micro transactions module 131C, and a transaction gallery module 131D. Any of the interfaces or modules stored in the memory 132 may be used to configure the user computing device 128 to facilitate both creating dynamic transaction report records 123A and completing the actions described herein that may be performed with the records 123A. In other embodiments, one or more of the interfaces and modules (i.e., 130, 130A, 130B, 130C, 130D, 130E, 131A, 131B, 131C, 131D) may be stored in a memory of the payment processing system 112 or multiple computing devices in a cloud-based model of execution and served to the computing device 128 via the network 111 when requested.

While the dynamic transaction record 123A is described as including various different types of data, those skilled in the art will recognize that the record 123A may include other types of data that could be related to consumer behavior such as physical distance from other transactions, number of transactions in the area, similar product information, discounts or coupon information for items related to the transaction, etc.

In some embodiments, the system 100 described above with reference to FIG. 1 may be implemented to determine substantially favorable moments in which to effectively engage a customer. These "micro-moments" may be times in which a consumer may be found to be demonstrating its intent clearly based on gathered data. In some embodiments, the system 100 may use a wide variety of consumer behavioral data to implement a micro-moment value algorithm (MMVA) to predict the optimal moment to engage a customer with a message or other communication relevant to the customers micro-moment intent. These intentions could be, for example, intention to purchase a product online, book a flight or hotel, make dinner reservations, or any other online activity. In some embodiments, the MMVA may use a variety of machine learning algorithms in developing its results. For example, the MMVA may use Bayesian Network graphical models, artificial neural networks, support vector machines, etc. In some embodiments, the control module 114 may perform calculations related to the MMVA.

In some embodiments, the MMVA can be expressed mathematically as Equation 1, below:

$$MMV_1 = \sum_{c=1}^{p} \sum_{e=1}^{y} \left(\frac{RCV}{Y_{i,t}}\right) * \left(\frac{\Pi radians}{ch5}\right) \quad \text{Eq. 1}$$

The MMV notations in Eq. 1 may represent the following as listed in Table 1, below:

TABLE 1

| Variable | Definition |
| --- | --- |
| p | Customer Index |
| y | Click Index |
| c | Conversion Index |
| e | Customer Experience Type |
| ch5 | Channels or devices |
| RCV | Real-time Customer Journey Value |
| Y | Contextual Signals Value |
| t | Synaptic Weight |
| Radians | Journey |

In some embodiments, the Customer Index may be the number of profiles or personas or a unique customer corresponding to a micro-moment, the Click Index may be a statistical measure of changes of individual Data Points in the click rate or a primary key for a cookie or other piece of software that records a micro-moment, and the Conversion Index may be a statistical measure of changes of individual Data Points in the conversion rate or a particular number used to identify a micro-moment as a conversion. In some embodiments, the Customer Experience Type may be a measure of whether the customer experience is complete, where e=1, or an incomplete experience, where e=0. A conversion for a signal may indicate a complete customer experience or e=1 whereas anything other than a conversion may indicate a value of 0 for the customer experience type. The Channel or devices may be different vectors for customer interfacing; for example, mobile phones, smart phones, desktop or laptop computers, internet-capable television, etc. In some embodiments, the Real-time Customer Journey Value (RCV) may represent click through Domains; for example, the number of signals gathered from consumer behavior based on clicking behavior while browsing or using a mobile app. In other embodiments, the RCV includes a random number that the system 100 uses to index the micro-moment. Contextual Signals Value may be synaptic signals through a graph of neurons; for example, as attained through an artificial neural network (ANN). In other embodiments, the Contextual Signals Value (Y) may be a value representing the context of the value associated with the micro-moment (i.e., a first value if the micro-moment was a click to complete a purchase, a second value if the micro-moment was a click to read an article or to send an email, delete an email, etc.). In some embodiments, the Synaptic Weight may be a number applied for weighting purposes in the ANN. The Journey, in some embodiments, may be expressed in radians and may be the value of the synaptic signals.

The micro-moment value (MMV) equation may be broken down into three components: the conversion rate, the signal of the click rate through domains, and the radian rate per channel. In some embodiments, the expression:

$$\sum_{e=1}^{y}\left(\frac{RCV}{Y_{i,t}}\right)$$

may represent the signal of the click rate through domains. In some embodiments, the expression:

$$\sum_{c=1}^{p}$$

may represent the conversion rate, particularly when applied to the signal of the click rate through domains. In some embodiments, the expression:

$$\left(\frac{\Pi radians}{ch5}\right)$$

may represent the click rate across channels or click rate per channel.

Figure 2:
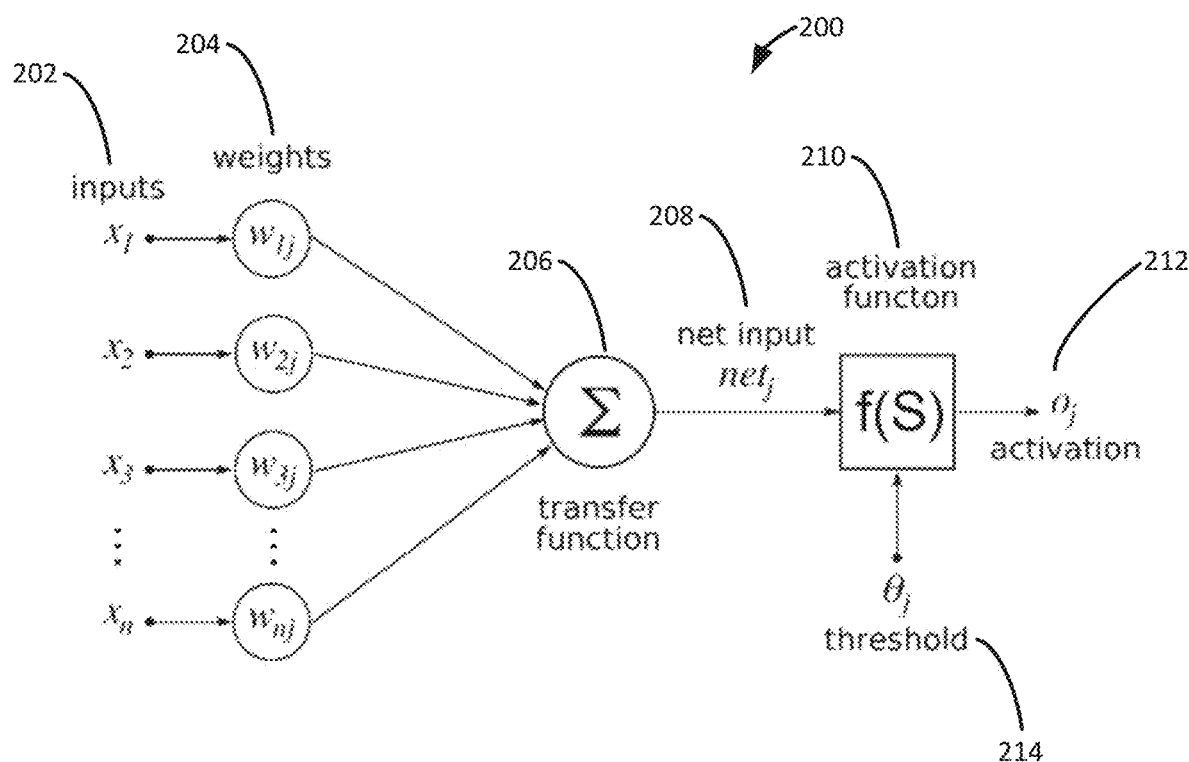
FIG. 2 illustrates an embodiment of an artificial neural network model as described herein.

In some embodiments, the artificial neural network model may be represented by the diagram 200 illustrated in FIG. 2. In such embodiments, the inputs 202 (e.g., $x_1$-$x_n$) may be any data points gathered from consumer behavior, as described in further detail with reference to FIG. 3. Weights 204 (e.g., $w_{1j}$-$w_{nj}$) may be applied to the inputs depending on the particular design of the artificial neural network. The result may be combined into a transfer function 206, the result of which may be a net input 208 (e.g., $net_j$) fed into an activation function 210. The activation junction 210 may output a threshold 214 (e.g., $\Theta_j$) and an activation 212 (e.g., $o_j$). The output of the artificial neural network may, in some embodiments, be represented by a perceptron equation, as shown in Equation 2, below:

$$\text{Output}=(1, \Sigma_{i=0}{}^n w_1 * x_1 > c, -1 \text{ otherwise}$$

In Eq. 2, w may be determined from a Hebb Synapse simulated learning equation, an embodiment of which is shown in Equations 3 and 4, below:

$$w_i^{k+1}=w_i^k+\Delta w_j \quad \text{Eq. 3}$$

$$\Delta w_j=\alpha \cdot (t-o) \cdot i \quad \text{Eq. 4}$$

where: t=Target
o=Output of the neural network
$\alpha$=Learning rate constants, between 0 and 1
i=Input of the weight As used herein, a "radian" is a data container used in the above algorithms to mathematically represent segments or "micro-moments" a user's journey. Past systems and methods of analyzing an individual's online presence to predict future online actions have used the individual's entire online history to make universal predictions about any particular moment of a user's internet presence. These past system have analyzed a customer's entire journey as the most effective way to market to a user based on a universal data set. In these past systems and methods, the accumulation of large amounts of data often leads to cumbersome calculations and inaccurate results as infinite data may lead to infinite results. The radian may provide definition to the limitless data related to web and other network interactions by providing a framework to calculate micro-moments as described herein. Rather than using all data that has been tracked for a customer to make a prediction about a future action, the radian contains a small amount of tracked data related to the time and duration of the action, a URL or other network location for the action, and a type of action. Framing each micro-moment or signal as a radian may allow predicting a follow-on action based on a set of signals corresponding to actions that precede the predicted action. Predicted events having the highest value for the MMVA, i.e., the highest duration for a particular action, will provide the best opportunity to reach the user for effective marketing.

In mathematics, a radian is an angle whose corresponding arc in a circle is equal to the radius of the circle. A circle has just more than six radians, A customer's complete "journey" may begin with an initial click or other tracked action related to a product or service at a domain or other "channel" and end with a purchase or other final action related to the domain, channel, good or service, etc. In some embodiments, a complete revolution of a circle is $2\pi$ radians and is analogous to a complete customer journey. In these embodiments, a customer's journey may be represented as a complete revolution of a circle and discrete events or signals related to the journey may be represented as radians. Values for each signal or "radian" may be assigned as degrees of a circle relative to the complete customer journey as shown in Table 1A, below. Where the final action in a series of actions or signals analyzed by Equation 1 and related to the domain, channel, good or service is a desired action (e.g., a conversion, purchase, etc.), then the value for the radian will reflect a complete journey or 360°. In further embodiments, where the final action related to the domain, channel, good or service is not a conversion or purchase, then the value for the radian will reflect something less than a complete journey or less than 360°. With brief reference to FIG. 4, each radian may include data for a single signal, action, or micro-moment. By stitching together several micro-moments based on known actual customer journey 412 for the user and an audience trend 414, the MMVA result may be a prediction 416 of the user's journey. Table 1A indicates values for the radian as a number of degrees for a customer journey, where a complete customer journey ending in conversion having ten total "signals" corresponding to a user may include ten "radians" or, as shown in the table below, a complete journey including sixteen signals may have sixteen different radian values,

TABLE 1A

| Radians | Degrees |
| --- | --- |
| 0, $2\pi$ | 0°, 360° |
| $\pi/6$ | 30° |
| $\pi/4$ | 45° |
| $\pi/3$ | 60° |
| $\pi/2$ | 90° |
| $2\pi/3$ | 120° |
| $3\pi/4$ | 135° |
| $5\pi/6$ | 150° |
| $\pi$ | 180° |
| $7\pi/6$ | 210° |
| $5\pi/4$ | 225° |
| $4\pi/3$ | 240° |
| $3\pi/2$ | 270° |
| $5\pi/3$ | 300° |
| $7\pi/4$ | 315° |
| $11\pi/6$ | 330° |

Figure 3:
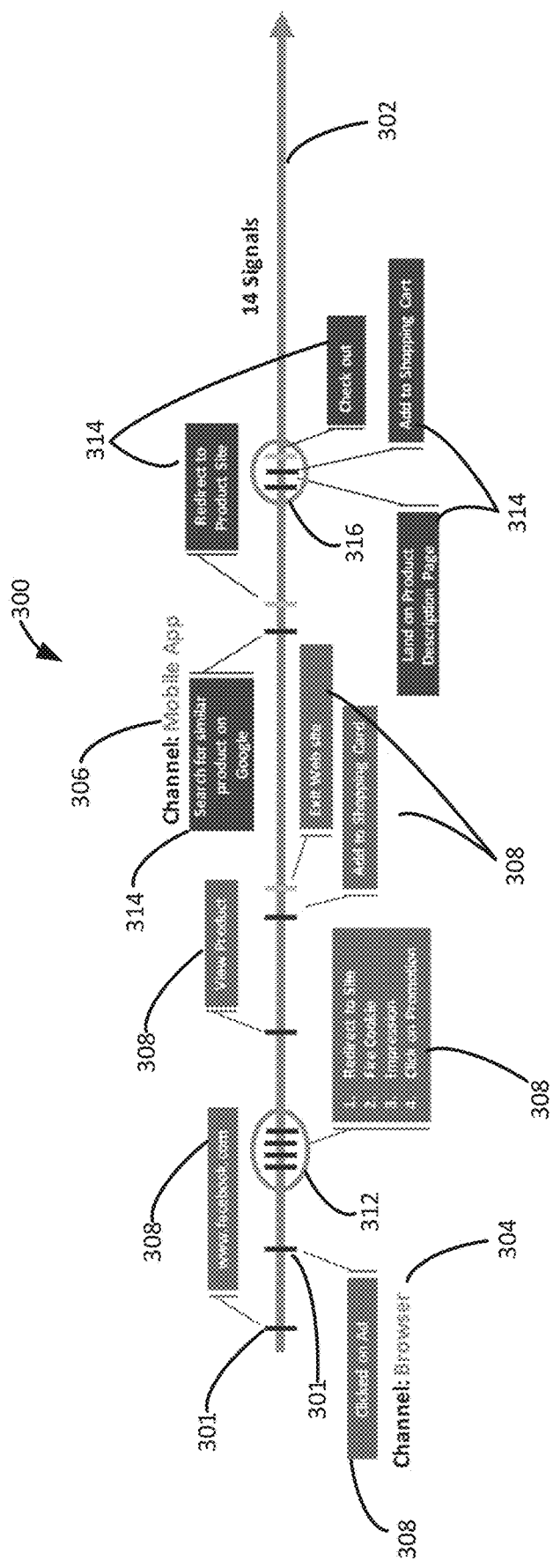
FIG. 3 illustrates an example customer journey use case as described herein.

FIG. 3 illustrates one embodiment of an example customer journey use case 300 that may result in signals that make up each radian to represent the data used as inputs for the MMVA. In this embodiment, the customer journey 302 is represented by an arrow moving and may represent passage of time. Points along the arrow may be single points in time where a customer performs an action 301, represented by hash marks along the journey arrow, that results in a signal. This particular embodiment includes 14 actions and, therefore, 14 signals, but any number of signals may be gathered and used. Each signal may be interpreted by the digital marketing platform 112 as data forming the customer profile. In this example, two channels (browser 304 and mobile app 306) are used by the customer, though it should be understood that fewer or more than two channels. The journey 302 includes multiple browser actions 308 conducted by the customer using an internet browser channel, such as on a desktop or laptop computer. In this embodiment, each of the browser signals are performed in the same domain. Some types of actions resulting in signals may include visiting social media sites, such as Facebook®.com, clicking on advertisements while on the social media site, viewing a product, adding a product to a shopping cart, and exiting the website. The browser signals 308 may also include a sequence of signals 312. In this embodiment, the sequence of signals 312 is four consecutive signals grouped together after a customer has clicked on an advertisement. These signals may be 1) redirecting to the advertiser's site, 2) firing a cookie, 3) an impression, and 4) clicking on a promotion.

The journey 302 also includes mobile signals 314 taken by a customer on a mobile app 306 accessed on a mobile device, such as a smartphone or tablet. As used herein, the term "signals" may include data corresponding to a user and online activity such as a click (I.a, clicking on a URL), an impression (e.g., a user typing in a specific URL and causing a browser to initiate a redirect action to reach a domain), a pixel (e.g., selecting images including at least one pixel having a tag and/or other data for the system 100 to track for a user), a cookie (e.g., a small piece of data sent from a website and stored on the user's computer by the user's web browser while the user is browsing to remember state information such as items added in the shopping cart in an online store or to record the user's browsing activity), etc. Some data included in a signal 314 may include a beginning time and an ending time at a website (e.g., a time between mouse events or from landing at a URL to the browser initiating a redirect action) a duration (e.g., an indication of user activity, how much time and attention the user pays to web content corresponding to a signal 312 at a particular domain and/or using a particular channel, mouse events, browser actions, etc.), a domain name, a tag number, a pixel name, a cookie name and value, and other data corresponding to the user's browsing activity. The cookie may allow the system 100 to collect syntactic information that reflects a degree of probability for a future action by the user and also indicates how often the user will initiate a type of network action. Thus, the micro-moment value may predict a significant duration for a particular network action or Internet domain activity and, thus, the most optimal time to present advertising targeted to the user to influence the user's journey.

In some embodiments, each of the mobile signals 314 is performed in the same domain as one another. Some types of actions resulting in mobile signals 314 may include searching for similar products on a search engine, such as Google, being redirected to the product website from the search engine, landing on the product description page, adding the product to the shopping cart, and checking out to purchase the product. The mobile signals 314 may include a sequence of mobile signals 316 that, in this case, are three consecutive signals grouped together. In the example illustrated in FIG. 3, the result of the browser signals 308 and the mobile signals 314 is a total of fourteen signals on the journey 302. These fourteen signals may be used as the RCV in the MMV Eq. 1, as shown in the example below.

The following is an example of a calculation made using the micro-moment value algorithm using example inputs that, in practice, would be the result of data gathering through system 100 of FIG. 1 for use in the digital marketing platform 112. It should be understood that the input values used herein are for the sake of example only, and do not in any way limit the values available for use in the MMVA that can be gathered and used by the digital marketing platform 112. In this example embodiment, the data values for the MMVA are as follows in Table 2:

TABLE 2

| Variable | Example Value |
|---|---|
| p | 3000 |
| y | 10 |
| c | 1 |
| e | 1 or i |
| ch5 | 1 |
| RCV | 14 |
| Y | 10 |
| t | Synaptic Weight |
| Radians | 360° or 2π |

Using p=3000 and y=10, the conversion rate and the signal of the click rate through domains becomes:

$$\sum_{c=1}^{p} \sum_{e=1}^{y} \left(\frac{RCV}{Y_{i,t}}\right) = \sum_{c=1}^{3000} \sum_{e=1}^{10} \left(\frac{14}{10_{i,t}}\right)$$

which can be expressed as:

$$\sum_{c=1}^{p} \sum_{e=1}^{y} \left(\frac{RCV}{Y_{i,t}}\right) = \sum_{c=1}^{3000} \left(\frac{14}{10_{i,1}} + \frac{14}{10_{i,2}} + \frac{14}{10_{i,3}} + \cdots + \frac{14}{10_{i,9}} + \frac{14}{10_{i,10}}\right)$$

Further, adding the click rate per channel, the MMVA may then be expressed as:

$$MMV_1 = \sum_{c=1}^{3000} \sum_{e=1}^{10} \left(\frac{14}{10_{i,t}}\right) * \left(\frac{\prod 2\pi}{1}\right) \qquad \text{Eq. 5}$$

Figure 4:
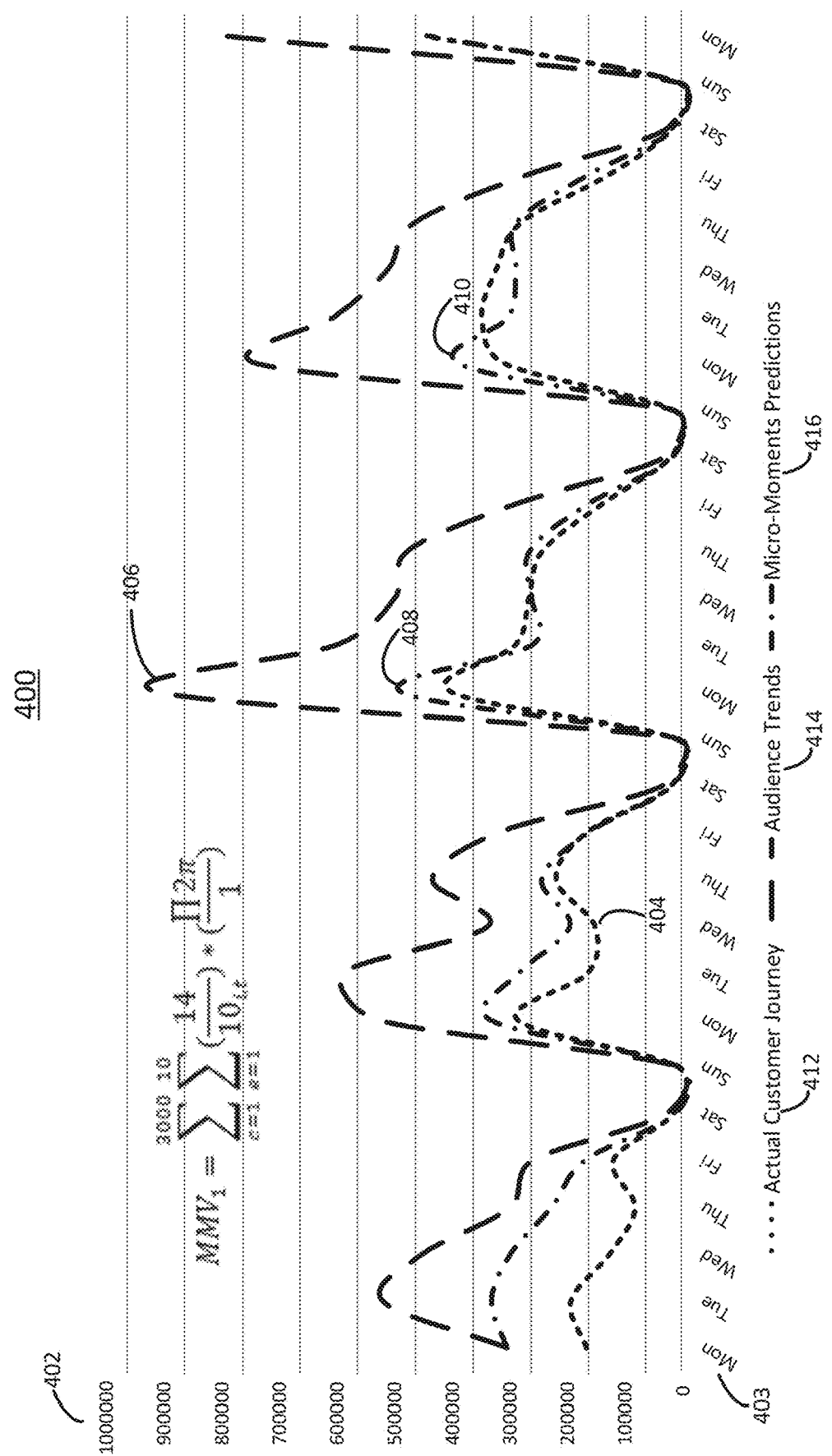
FIG. 4 illustrates a graph of example micro-moment values plotted over time.

FIG. 4 illustrates an example graph 400 of the micro-moment predictions 402 over time, indicated on the horizontal axis as days of the week 401. The results of the MMVA shown in FIG. 4 are plotted as the micro-moment predictions 402 expressed in the example culminating in Equation 5, above. The graph 400 in FIG. 4 additionally shows the actual customer journey 404 and audience trends 406. One goal of the micro-moments predictions 402 calculated using the MMVA is to replicate the actual customer journey 404. This allows the digital marketing platform 112 to most accurately predict the micro-moment for engagement with the customer. In some embodiments, these "key" micro-moments may be at the peaks of the MMVA plot. For example, in FIG. 4, the micro-moment predictions 402 may have a first predicted key moment 408 at a peak in the micro-moment predictions plot. As shown in the graph 400, a plot of the micro-moment predictions may have a second predicted key moment 410 at another peak in the micro-moment predictions plot. In the illustrated embodiment of FIG. 4, these peaks may correspond to an amount of time corresponding to a signal (e.g., signals 312 with reference to FIG. 3) in the various plots of the graph 400 (e.g., the actual customer journey 412 plot, the audience trends 414 plot, the micro-moments predictions plot 416, etc.).

With further reference to FIG. 4, the method 500 generally and Eq. 1 in particular as described herein may result in values for micro moments to predict user trends for engaging a user at a favorable time. The graph 400 includes a y-axis having micro-moment predictions 402 and an x-axis having a time period 403 corresponding to the micro-moment prediction 402. In some embodiments, the inputs to Eq. 1 may result in micro-moment predictions 402 of a measure of time (e.g., milliseconds, etc.) of user behavior corresponding to a signal (e.g., signals 312 of FIG. 3) for the particular time period 403. For example, the first predicted key moment 408 may indicate a duration of about 500,000 milliseconds corresponding to Monday morning at a particular URL using a particular channel (i.e., a type of device and/or method for reaching the URL).

Figure 5:
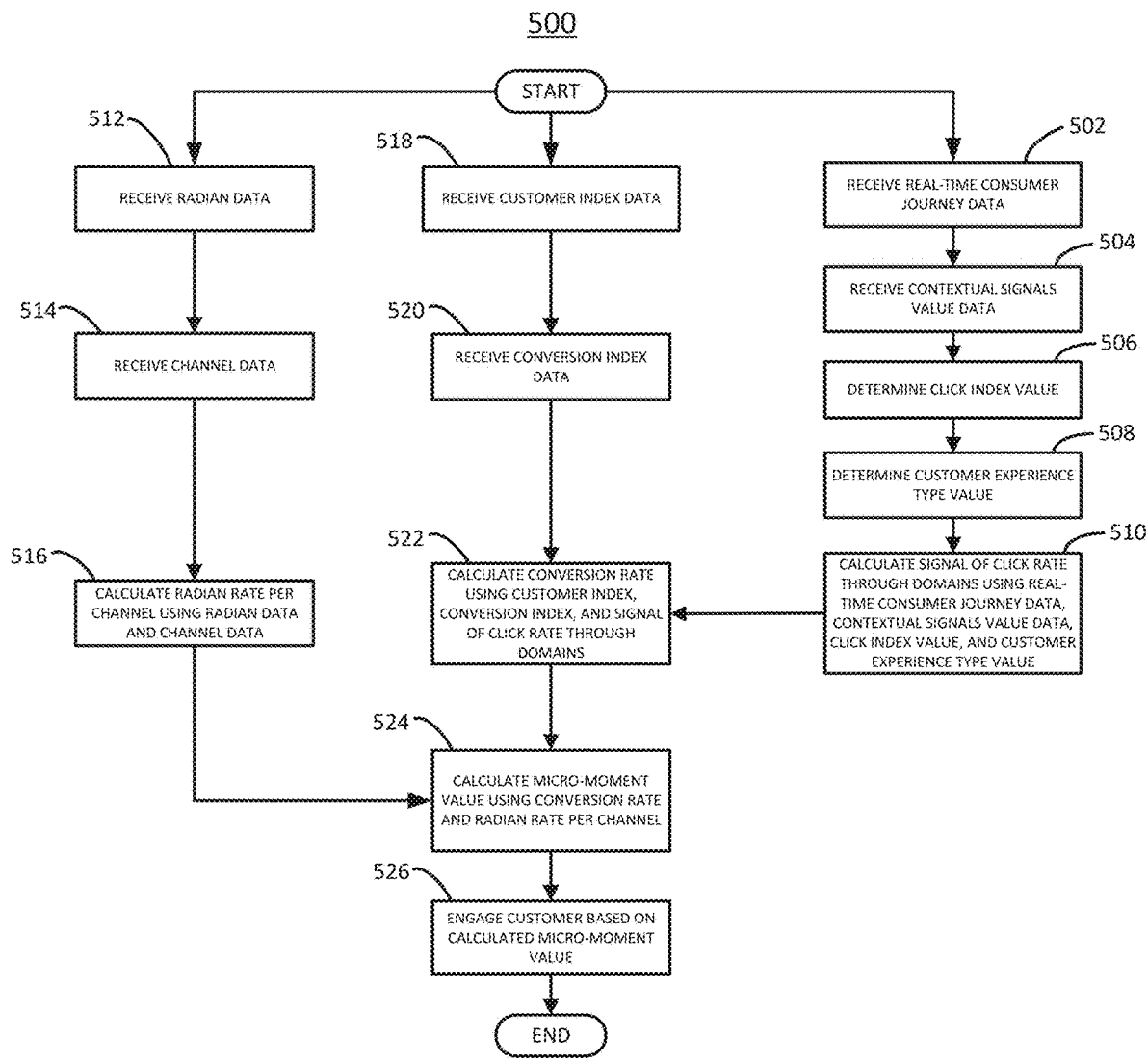
FIG. 5 illustrates an exemplary process flow for determining a micro-moment value for use with the system for linking dynamic information to a digital marketing platform as described herein.

FIG. 5 illustrates an embodiment of a method 500 for predicting a micro-moment using the MMVA through the digital marketing platform 112. Each step of the method may be performed on a server or other computing device including instructions that, when executed by a processor, perform the action or block described herein. At block 502, the method may include receiving the real-time consumer journey data via the digital marketing platform 112. At block 504, the method may include receiving contextual signals value data, and at block 506 may include determining a click index value. At block 508, the method may include determining a customer experience type value. At block 510, the method may include calculating a signal of click rate through domains using the real-time consumer journey data, the contextual signals value data, the click index value, and the customer experience type value. At block 512, the method may include receiving radian data through the digital marketing platform 112. At block 514, the method may include receiving channel data. At block 516, the method may include calculating a radian rate per channel using the radian data and the channel data. At block 518, the method may include receiving customer index data via the digital marketing platform 112. At block 520, the method may include receiving conversion index data. At block 522, the method may include calculating a conversion rate using the customer index, the conversion index, and the signal of the click rate through domains. At block 524, the method may include calculating a micro-moment value using the conversion rate and the radian rate per channel. In some embodiments, at block 526, the method may include engaging a customer based on the calculated micro-moment value. In some embodiments, engaging the customer may include, but is not limited to, sending a promotional offer, sending an electronic coupon, or sending a targeted advertisement, etc., at the predicted time and network location indicated by the MMVA.

In some embodiments, the system 100 may include a module to determine a value for each customer. For example, an algorithm may determine whether a customer is going to be profitable or not and for how long. Too, an algorithm may predict the monetary value associated with a customer relationship. Equation 6 illustrates one example of a customer lifetime value ("CLV") algorithm:

$$CLV = \sum_{m=1}^{t} \left( \frac{\text{Future Contribution Margins}}{\text{Historical Lifetime Value} * p} \right) - \left( \frac{\text{Cost of Acquisition}}{CL^{(m)}} \right) \quad \text{Eq. 6}$$

In Equation 6, m=the micro-moment index; c=Customer Index; p=total number of purchases in a period of time; t=number of time period the CLV is being calculated; and CL=the Customer Loyalty Index. The CLV algorithm of Equation 6 may allow observation of various individual-level buying patterns from the past and find the various customer stories in the data set. It may also allow understanding of which patterns correspond with valuable customers and which patterns correspond with customers who are opting out. As new customers join a system implementing the CLV algorithm of Equation 6, the system (e.g., system 100) may match the new customer to patterns that are recognized by the CLV algorithm.

In some embodiments, the system 100 may also include a module to determine which impressions will best meet the advertising performance metrics. For example, an algorithm may optimize timing for real-time bidding ("RTB") on customer impressions within a website for a merchant. For example, advertising campaign budget constraints may be given as impression delivery goals $q_j$. An impression group r may be defined as a (placement, user) tuple, at which level both click-through-rate ("CTR") prediction $p_{ij}$ and inventory control represented by Equation 7 may be performed:

$$\sum_{j}^{1} x_{ij} \leq h_i \quad \text{Eq. 7}$$

Given the above, the cost term $w_i$ will be zero since impressions are from the inventory. Thus, the revenue lift and the CTR lift may be represented by Equations 8 and 9, below:

$$\text{Revenue lift} = \frac{y'}{y} = \frac{\sum t, i, j, x'_{ij}(t) p_{ij} q_j}{\sum t, i, j, c'_{ij}(t) q_j} \quad \text{Eq. 8}$$

$$\text{CTR lift} = \frac{CTR'}{CTR} = \frac{\sum t, i, j, x'_{ij}(t) p_{ij} / \sum t, i, j, x'_{ij}(t)}{\sum t, i, j, c'_{ij}(t) q_j / \sum t, i, j, x'_{ij}(t)} \quad \text{Eq. 9}$$

The timing for RTB may also be optimized by the following pseudo code:

```
    Input: q_j, g_j, α_j, ∀j
    Output: x_ij, β_i, ∀i, j
1 begin
2   |  G ← ∅;
3   |  foreach impression i from a stream do
4   |    |  p_ij = p(click|i, j), ∀j;
5   |    |  v_ij ← p_ij q_j, ∀j;
6   |    |  j* ← argmax_{j∉G} (v_ij − α_j);
7   |    |  if (v_ij* − α_j*) > 0 then
8   |    |    |  x_ij* ← 1;
9   |    |    |  x_ij ← 0, ∀j ≠ j*;
10  |    |    |  β_i ← v_ij* − α_j*;
```

```
11  |   |   |   if Σᵢ' xᵢⱼ* = gⱼ* then
12  |   |   |   |  G ← G ∪ j*;
13  |   |   |  end
14  |   |  end
15  |   |  αⱼ ← UpdateAlpha(αⱼ), ∀j;
16  |  end
17 end
```

In some embodiments, the system 100 may also include a module to evaluate each customer impression based on its predicted probability to achieve a goal of the advertising campaign. For example the module may evaluate Equations 10 and 11, below.

$$mfb = \frac{\epsilon + \gamma - P(B_{i*})}{\gamma} \left| \frac{\gamma - P(B_{i*})}{\gamma} \right| \quad \text{Eq. 10}$$

$$V_{cpm} = C_{explore} + C_{panic} + (n^*_{exploit})T_{i^* - 1 \leq \varphi t} \int n \quad \text{Eq. 11}$$

Where $C_{panic}$=a number of impressions won during a panic; $C_{exploit}$=a number of impressions won during exploitation; and $C_{explore}$=a number of impressions won during exploration. Costs per thousand ("CPM") may also be analyzed by the following pseudocode:

```
50: If g_remain ≤ 0 or j ≥ n then Terminate.
51: B_final ← B_{i*}.
52:  A ← g_remain / (P_i * (n - j)).
53: if P_{i*}(n - j) > g_remain and T_{i*}g_remain > budget then
54:    Sort p ∈ S_{i*}: define q_k to be the kth smallest p in S_{i*}.
55:    k_s ← ⌈(g_remain / (n - j)) m⌉
56:    for k = 1 to |S_{i*}| do g_k ← (1/k) Σ_{i=1}^{k} q_i.
57:    t* ← budget / g_remain.
58:    k_p ← min_{k : g_k ≥ t*} k.
59:    k* ← max(k_s, k_p).
60:    B_final ← q_{k*}.
61:    A ← k* / m.
62:    A ← g_remain / (A(n - j)).
63: end if
64: while More rounds and g_remain > 0 do
65:    Bid B_final with probability A, 0 otherwise.
66:    If Bid won then g_remain ← g_remain - 1.
67: end while
``` where optimized daily or other periodic budget updates may be calculated and posted, as needed, to meet each campaign goal.

Figure 6:
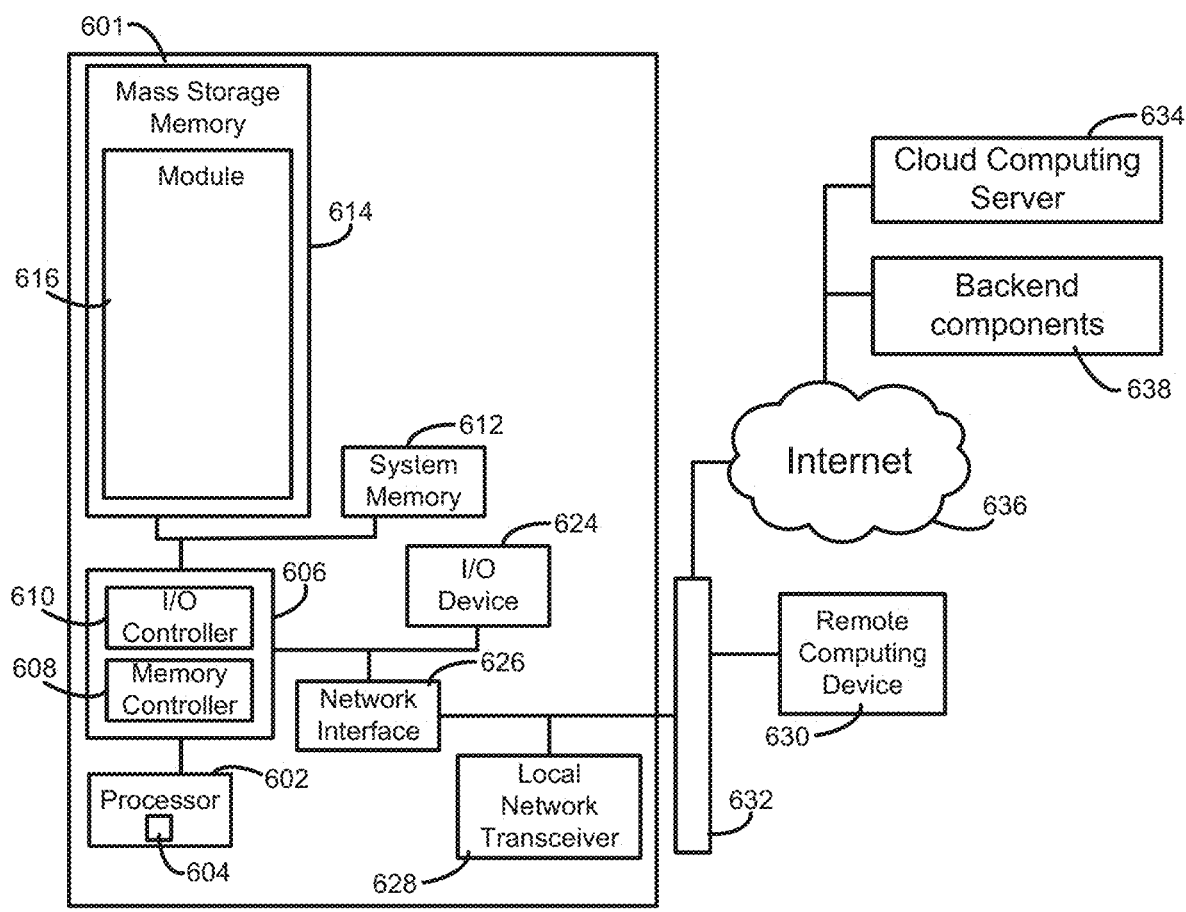
FIG. 6 illustrates an exemplary computing device used within the system for linking dynamic information to a digital marketing platform and to implement the various process flows or methods described herein.

FIG. 6 is a high-level block diagram of an example computing environment 600, for example, for linking the digital marketing platform to front end components that may run the customer digital content browser and/or the merchant digital content system. The computing device 601 may include a server (e.g., the data processing server 118), a mobile computing device (e.g., computing device 128, a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods for linking dynamic information, such as customer data, to a data record may be used to implement and execute the example systems of FIG. 1. Although the example system 600 is described below as including a plurality of peripherals, interfaces, chips, memories, etc., one or more of those elements may be omitted from other example processor systems used to implement and execute the example system for linking dynamic information to a digital marketing platform. Also, other components may be added.

As shown in FIG. 6, the computing device 601 includes a processor 602 that is coupled to an interconnection bus. The processor 602 includes a register set or register space 604, which is depicted in FIG. 6 as being entirely on-chip, but which could alternatively be located entirely or partially off-chip and directly coupled to the processor 602 via dedicated electrical connections and/or via the interconnection bus. The processor 602 may be any suitable processor, processing unit or microprocessor. Although not shown in FIG. 6, the computing device 601 may be a multi-processor device and, thus, may include one or more additional processors that are identical or similar to the processor 602 and that are communicatively coupled to the interconnection bus.

The processor 602 of FIG. 6 is coupled to a chipset 606, which includes a memory controller 608 and a peripheral input/output (I/O) controller 610. As is well known, a chipset typically provides I/O and memory management functions as well as a plurality of general purpose and/or special purpose registers, timers, etc. that are accessible or used by one or more processors coupled to the chipset 606. The memory controller 608 performs functions that enable the processor 602 (or processors if there are multiple processors) to access a system memory 612 and a mass storage memory 614, that may include either or both of an in-memory cache (e.g., a cache within the memory 612) or an on-disk cache (e.g., a cache within the mass storage memory 614).

The system memory 612 may include any desired type of volatile and/or non-volatile memory such as, for example, static random access memory (SRAM), dynamic random access memory (DRAM), flash memory, read-only memory (ROM), etc. The mass storage memory 614 may include any desired type of mass storage device. For example, if the computing device 601 is used to implement a module 616 (e.g., the various modules link dynamic information, such as photographs, to a payment device transaction record and to create the dynamic transaction record and other modules as herein described). The mass storage memory 614 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 601 and the system 100. Thus, a module, block, function, operation, procedure, routine, step, and method can be implemented in hardware, firmware, and/or software. In one embodiment, program modules and routines are stored in mass storage memory 614, loaded into system memory 612, and executed by a processor 602 or can be provided from computer program products that are stored in tangible computer-readable storage mediums (e.g. RAM, hard disk, optical/magnetic media, etc.).

The peripheral I/O controller 610 performs functions that enable the processor 602 to communicate with a peripheral input/output (I/O) device 624, a network interface 626, a local network transceiver 628, (via the network interface 626) via a peripheral I/O bus. The I/O device 624 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 624 may be used with the module 616, etc., to receive data from the transceiver 628, send the data to the backend components of the system 100, and perform any operations related to the methods as described herein. The local network transceiver 628 may include support for a Wi-Fi network, Bluetooth, Infrared, cellular, or other wireless data transmission protocols. In other embodiments, one element may simultaneously support each of the various wireless protocols employed by the computing device 601. For example, a software-defined radio may be able to support multiple protocols via downloadable instructions. In operation, the computing device 601 may be able to periodically poll for visible wireless network transmitters (both cellular and local network) on a periodic basis. Such polling may be possible even while normal wireless traffic is being supported on the computing device 601. The network interface 626 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 608 and the I/O controller 610 are depicted in FIG. 6 as separate functional blocks within the chipset 606, the functions performed by these blocks may be integrated within a single integrated circuit or may be implemented using two or more separate integrated circuits. The computing environment 600 may also implement the module 616 on a remote computing device 630. The remote computing device 630 may communicate with the computing device 601 over an Ethernet link 632. In some embodiments, the module 616 may be retrieved by the computing device 601 from a cloud computing server 634 via the Internet 636. When using the cloud computing server 634, the retrieved module 616 may be programmatically linked with the computing device 601. The module 616 may be a collection of various software platforms including artificial intelligence software and document creation software or may also be a Java® applet executing within a Java® Virtual Machine (JVM) environment resident in the computing device 601 or the remote computing device 630. The modeling module 620 and the execution module 622 may also be "plug-ins" adapted to execute in a web-browser located on the computing devices 601 and 630. In some embodiments, the module 616 may communicate with back end components 638 such as the backend components 110 of FIG. 1 via the Internet 636.

The system 600 may include but is not limited to any combination of a LAN, a MAN, a WAN, a mobile, a wired or wireless network, a private network, or a virtual private network. Moreover, while only one remote computing device 630 is illustrated in FIG. 6 to simplify and clarify the description, it is understood that any number of client computers are supported and can be in communication within the system 100.

Figure 7:
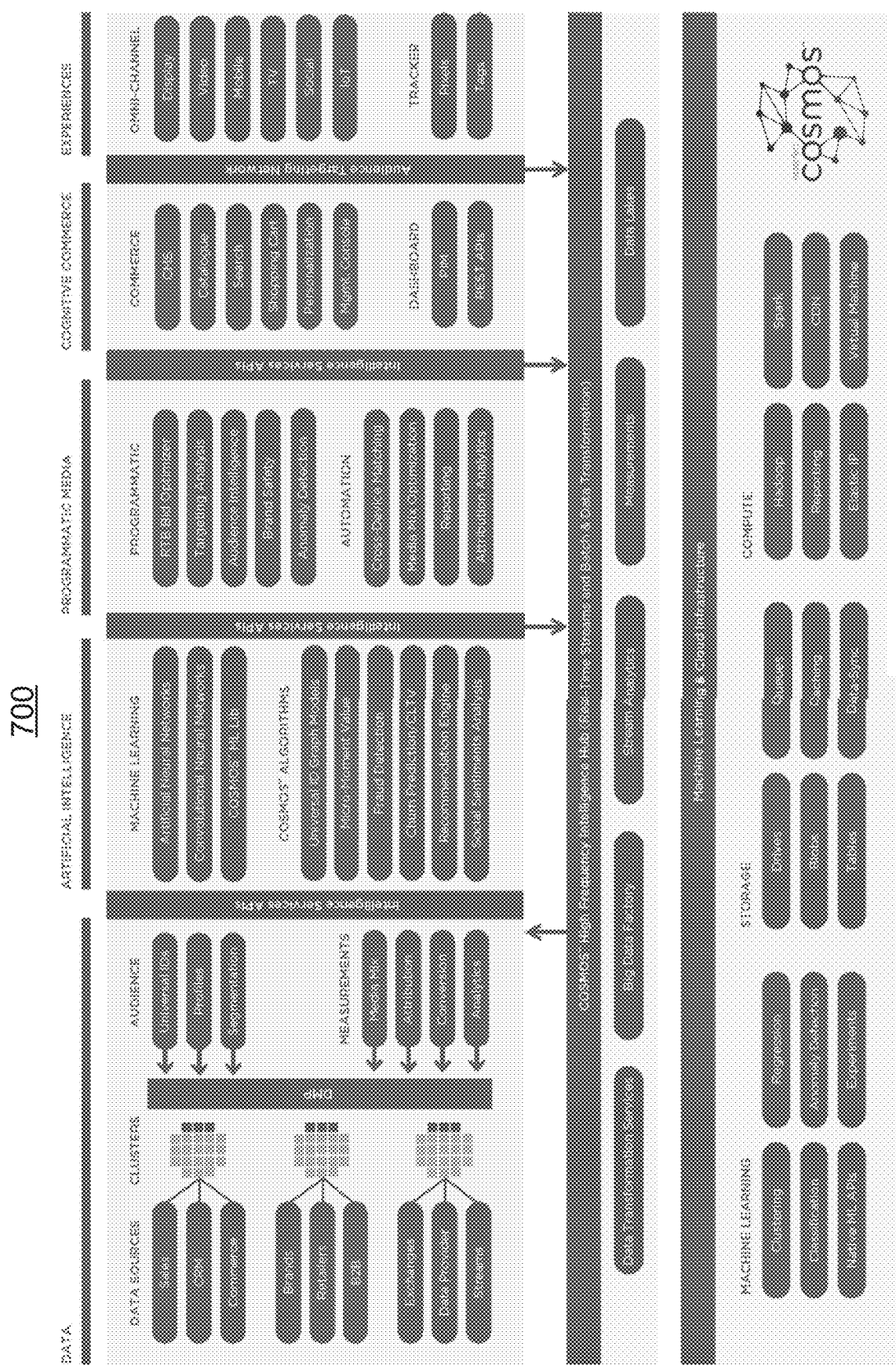
FIG. 7 illustrates an exemplary structure for the system for determining a micro-market value across multiple computer network devices and channels as described herein.

FIG. 7 is a high-level block diagram of the various components of the system 100.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for determining a micro-moment value, the method comprising:

receiving a plurality of signals from a plurality of online actions, the plurality of signals corresponding to an online profile for a consumer (p), and each of the plurality of signals including one or more of a past duration, a past network location, a past time period, and a past action type;

determining a predicted micro-moment value based on the plurality of signals, the predicted micro-moment value predicting one or more of a future duration, a future network location, and a future time period for a further online action for the consumer, the micro-moment value consisting of:

$$MMV_1 = \sum_{c=1}^{p} \sum_{e=1}^{y} \left(\frac{RCV}{Y_{i,t}}\right) * \left(\frac{\Pi \text{radians}}{\text{channel}}\right)$$

wherein:

$$\sum_{c=1}^{p}$$

includes a conversion index (c) for the plurality of signals that include a conversion (c=1) across the plurality of online profiles (p), and consists of:

$$\sum_{\substack{\text{Conversion Index } (c)=1}}^{\text{Total Number of Profiles } (p)}$$

wherein:

$$\sum_{e=1}^{y} \left(\frac{RCV}{Y_{i,t}}\right)$$

includes a click rate through domains, wherein the click rate through domains consists of:

$$\sum_{\substack{\text{Customer Experience} \\ \text{Value } (e)=1 \text{ or } 0}}^{\text{Click Index } (y)} \frac{\text{Real-time Customer Journey Value } (RCV)}{\text{Contextual Signals Value } (Y)}$$

wherein the click index (y) includes a statistical measure of changes of individual data points in the click rate through domains, the customer experience value includes a value of 1 for each of the plurality of signals that includes the conversion or a value of 0 for each of the plurality of signals that does not include the conversion, the RCV includes an index value for each of the plurality of signals, and Y includes a value based on the past action type;

wherein:

$$\left(\frac{\Pi \text{radians}}{\text{channel}}\right)$$

includes a click rate per channel and the radians include a value based on a total number for the plurality of signals and the channel equals a value corresponding to a type of device accessing the domain; and sending digital content to the customer at the future network location for the future duration when the micro-moment value reaches the future time period corresponding to a predicted key moment in a plot of the predicted micro-moment values, wherein the micro-moment value indicates the future duration, the future time period, and the future network location for sending the digital content to the customer.

2. The computer-implemented method of claim 1, wherein the plurality of profiles (p) includes a total number of profiles for the first plurality of signals and the second plurality of signals.

3. The computer implemented method of claim 2, wherein the conversion index (c) includes a statistical measure of changes in the plurality of signals.

4. The computer implemented method of claim 3, wherein the real-time customer journey value (RCV) includes a total count of the first plurality of signals and the second plurality of signals.

5. The computer-implemented method of claim 4, wherein the click index (y) further includes the plurality of signals for each of a browser accessing the first domain and a mobile application in communication with a second domain.

6. The computer-implemented method of claim 5, wherein the contextual signals value (Y) predicts a further signal accessing the domain based on the plurality of signals, wherein the contextual signals value includes an output of an artificial neural network (ANN), and inputs to the ANN include the first plurality of signals, the second plurality of signals, weights applied to each of the first plurality of signals and the second plurality of signals, a transfer function having the first plurality of signals, the second plurality of signals, and the weights as input to the transfer function, an activation function including an output of the transfer function.

7. The computer-implemented method of claim 6, wherein an ANN output includes a perceptron equation.

8. The computer-implemented method of claim 7, wherein one or more synapses of the ANN includes a Hebb synapse.

9. A system for determining a micro-moment value comprising:
   at least one processor, and
   at least one memory storing computer executable instructions that, when executed by the at least one processor, cause the system at least to perform the steps of:
   receiving a plurality of signals from a plurality of online actions, the plurality of signals corresponding to an online profile for a consumer (p), and each of the plurality of signals including one or more of a past duration, a past network location, a past time period, and a past action type;
   determining a predicted micro-moment value based on the plurality of signals, the micro-moment value predicting one or more of a future duration, a future network location, and a future time period for a further online action for the consumer, the micro-moment value consisting of:

$$MMV_1 = \sum_{c=1}^{p} \sum_{e=1}^{y} \left(\frac{RCV}{Y_{i,t}}\right) * \left(\frac{\Pi \text{radians}}{\text{channel}}\right)$$

wherein:

$$\sum_{c=1}^{p}$$

includes a conversion index (c) for the plurality of signals that include a conversion (c=1) across the plurality of online profiles (p), and consists of:

$$\sum_{\substack{\text{Conversion Index } (c)=1}}^{\text{Total Number of Profiles } (p)}$$

-continued wherein $$\sum_{e=1}^{y}\left(\frac{RCV}{Y_{i,t}}\right)$$

includes a click rate through domains, wherein the click rate through domains consists of:

$$\sum_{\substack{Customer\ Experience \\ Value\ (e)=1\ or\ 0}}^{Click\_Index\ (y)} \frac{\text{Real-time Customer Journey Value }(RCV)}{\text{Contextual Signals Value }(Y)}$$

wherein the click index (y) includes a statistical measure of changes of individual data points in the click rate through domains, the customer experience value includes a value of 1 for each of the plurality of signals that includes the conversion or a value of 0 for each of the plurality of signals that does not include the conversion, the RCV includes an index value for each of the plurality of signals, and Y includes a value based on the past action type;

wherein:

$$\left(\frac{\Pi radians}{channel}\right)$$

includes a click rate per channel and the radians include a value based on a total number for the plurality of signals and the channel equals a value corresponding to a type of device accessing the domain; and sending digital content to the customer at the future network location for the future duration when the micro-moment value reaches the future time period corresponding to a predicted key moment in a plot of the predicted micro-moment values, wherein the micro-moment value indicates the future duration, the future time period, and the future network location for sending the digital content to the customer.

10. The system of claim 9, wherein the plurality of profiles (p) includes a total number of profiles for the first plurality of signals and the second plurality of signals.

11. The system of claim 10, wherein the conversion index (c) includes a statistical measure of changes in the plurality of signals.

12. The system of claim 11, wherein the real-time customer journey value (RCV) includes a total count of the first plurality of signals and the second plurality of signals.

13. The system of claim 12, wherein the click index (y) further includes the plurality of signals for each of a browser accessing a first domain and a mobile application in communication with a second domain.

14. The system of claim 13, wherein the contextual signals value (Y) predicts a further signal accessing the domain based on the plurality of signals, wherein the contextual signals value includes an output of an artificial neural network (ANN), and inputs to the ANN include the first plurality of signals, the second plurality of signals, weights applied to each of the first plurality of signals and the second plurality of signals, a transfer function having as input to the transfer function the first plurality of signals, the second plurality of signals, and the weights, and an activation function including an output of the transfer function.

15. The system of claim 14, wherein an ANN output includes a perceptron equation.

16. The system of claim 15, wherein one or more synapses of the ANN includes a Hebb synapse.

* * * * *